(12) United States Patent
Schmidt et al.

(10) Patent No.: US 12,032,057 B2
(45) Date of Patent: Jul. 9, 2024

(54) DISTANCE MEASUREMENT SYSTEM FOR A VEHICLE

(71) Applicant: MOBA Mobile Automation AG, Limburg (DE)

(72) Inventors: Thomas Schmidt, Limburg (DE); Martin Jan Gemmer, Limburg (DE); Alfons Horn, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 299 days.

(21) Appl. No.: 17/113,364

(22) Filed: Dec. 7, 2020

(65) Prior Publication Data
US 2021/0181337 A1    Jun. 17, 2021

(30) Foreign Application Priority Data
Dec. 13, 2019 (DE) .................... 102019219619.5

(51) Int. Cl.
*G01S 13/931* (2020.01)
*G01S 7/02* (2006.01)
*G01S 13/08* (2006.01)

(52) U.S. Cl.
CPC ............ *G01S 13/931* (2013.01); *G01S 13/08* (2013.01); *G01S 7/027* (2021.05)

(58) Field of Classification Search
CPC ...... G01S 13/931; G01S 13/08; G01S 17/931; G01S 15/931; G01S 7/4972

(Continued)

(56) References Cited

U.S. PATENT DOCUMENTS 4,293,859 A * 10/1981 Sergent .................. H01Q 1/241
                                                     343/781 R
4,698,640 A * 10/1987 Redman ................. H01Q 1/125
                                                      343/882

(Continued)

FOREIGN PATENT DOCUMENTS

CN        108469610 A     8/2018
DE        10146808 A1     4/2003

(Continued)

OTHER PUBLICATIONS

Technische Beschreibung AMS 304i, Leuze electronic GmbH + Co. KG, Apr. 2011—with English version (115 pages).

(Continued)

*Primary Examiner* — Ladimir Magloire
*Assistant Examiner* — Michael W Justice
(74) *Attorney, Agent, or Firm* — PERKINS COIE LLP; Michael A. Glenn

(57) ABSTRACT

Distance measurement system for a vehicle, wherein the distance measurement system includes a measurement unit for non-contact determination of a distance to an object and the measurement unit includes: a sensor unit configured to emit a signal and to receive a signal reflected by the object; an evaluation unit determining a distance between the measurement unit and the object from the signals emitted and received by the sensor unit; and a signal deflection apparatus arranged in the area of the sensor unit with a reflector surface deflecting the signal emitted by the sensor unit in a direction deviating from the propagation direction of the signal, in particular at an essentially right angle to the propagation direction of the signal, in the direction of the object.

24 Claims, 5 Drawing Sheets

(58) Field of Classification Search
USPC .......................................................... 342/70
See application file for complete search history.

(56) References Cited

U.S. PATENT DOCUMENTS

| | | | | |
|---|---|---|---|---|
| 6,034,642 | A * | 3/2000 | Kojima | G01S 13/931 |
| | | | | 343/753 |
| 6,122,537 | A * | 9/2000 | Schmidt | G01S 13/56 |
| | | | | 600/407 |
| 6,215,415 | B1 | 4/2001 | Schroeder | |
| 6,842,152 | B2 * | 1/2005 | Kikuchi | H01Q 1/3233 |
| | | | | 343/878 |
| 8,365,577 | B2 * | 2/2013 | Seeck | G01N 1/2208 |
| | | | | 73/431 |
| 9,415,986 | B2 * | 8/2016 | Cummings | B66F 17/006 |
| 9,679,461 | B2 * | 6/2017 | Cummings | B66F 17/006 |
| 10,324,170 | B1 * | 6/2019 | Engberg, Jr. | G01S 7/4818 |
| 10,358,331 | B2 * | 7/2019 | Lombardo | B66F 11/044 |
| 10,422,682 | B2 * | 9/2019 | Hengstler | H01Q 1/225 |
| 10,578,720 | B2 * | 3/2020 | Hughes | G02B 26/105 |
| 2002/0080079 | A1 * | 6/2002 | McCandless | H01Q 15/24 |
| | | | | 343/772 |
| 2004/0017308 | A1 * | 1/2004 | Kikuchi | G01S 13/931 |
| | | | | 342/75 |
| 2011/0088454 | A1 * | 4/2011 | Seeck | G01N 1/2208 |
| | | | | 73/29.01 |
| 2012/0236563 | A1 | 9/2012 | Breidenassel et al. | |
| 2013/0051012 | A1 | 2/2013 | Oehle et al. | |
| 2013/0083525 | A1 | 4/2013 | Koo et al. | |
| 2016/0075543 | A1 * | 3/2016 | Lombardo | B66F 11/044 |
| | | | | 187/247 |
| 2016/0098910 | A1 * | 4/2016 | Cummings | G08B 21/02 |
| | | | | 340/540 |
| 2016/0099122 | A1 * | 4/2016 | Cummings | B66F 17/006 |
| | | | | 200/5 R |
| 2018/0057333 | A1 * | 3/2018 | Gale | B66F 11/04 |
| 2019/0310351 | A1 * | 10/2019 | Hughes | G02B 26/101 |
| 2019/0324147 | A1 * | 10/2019 | Day | G01S 7/4817 |
| 2023/0278842 | A1 * | 9/2023 | Mohlman | B66F 9/0755 |
| | | | | 701/301 |

FOREIGN PATENT DOCUMENTS

| | | | | |
|---|---|---|---|---|
| DE | 102009023268 | A1 | 6/2010 | |
| DE | 202010002676 | U1 | 7/2011 | |
| DE | 102010063886 | A1 | 6/2012 | |
| DE | 102008064896 | B3 | 8/2018 | |
| DE | 102016208508 | B4 * | 11/2018 | ............ G01C 13/00 |
| DE | 102017209941 | A1 | 12/2018 | |
| EP | 1452479 | A1 | 9/2004 | |
| EP | 3173369 | A1 | 5/2017 | |
| EP | 3369698 | B1 | 2/2020 | |
| JP | 2013010589 | A * | 1/2013 | |
| JP | 2013010589 | A | 1/2013 | |
| KR | 20190136145 | A | 12/2019 | |
| WO | 2017028984 | A1 | 2/2017 | |
| WO | 2017178737 | A1 | 10/2017 | |
| WO | 2018228855 | A1 | 12/2018 | |

OTHER PUBLICATIONS

Technische Beschreibung AMS 304i, Leuze electronic GmbH + Co. KG, Apr. 2011 with Non-English (116 pages).

* cited by examiner

DISTANCE MEASUREMENT SYSTEM FOR A VEHICLE

CROSS-REFERENCE TO RELATED APPLICATIONS

This application claims priority from German Patent Application No. 102019219619.5, which was filed on Dec. 13, 2019, and is incorporated herein in its entirety by reference.

Embodiments of the present invention relate to a distance measurement system as well as to a vehicle having a distance measurement system. Generally, the invention is in the field of vehicles, such as mobile construction or work machines, elevating work platforms, fire engine turntable ladders or the same.

BACKGROUND OF THE INVENTION

From WO 2017/178737 A1, a control panel for an elevating platform with protection against crushing of the operator is known. The elevating work platform includes a work cage with rails provided thereon, wherein a control panel for controlling movements of the elevating work platform is arranged on the rails. A system by which it can be determined whether the control panel is mounted on the rails, whether a person is in the work cage next to the control panel or leans in the direction of the control panel or whether an obstacle exists, is arranged on the control panel. For this, the system includes at least one transmitter and one receiver of waves, wherein the system detects an interference by an external object in that the receiver receives the waves emitted by the transmitter by reflection from the interfering object.

It is a disadvantage of the known system that depending on the arrangement of the control panel in the work cage, not all objects in the surroundings of the work cage are detected and hence collisions with obstacles that have not been detected can result when the work cage is moving. Further, erroneous measurements can occur, in particular with transmitters and receivers oriented towards the top as, for example, rainwater may not run off but remains on the sensor heads. This can have the effect that a person leaning in the direction of the control panel may not be detected or may not be detected correctly and might get caught.

SUMMARY

An embodiment may have a distance measurement system for a vehicle, wherein the distance measurement system includes a measurement unit for non-contact determination of a distance to an object, and the measurement unit includes: a sensor unit configured to emit a signal and to receive a signal reflected by the object; an evaluation unit determining a distance between the measurement unit and the object from the signals emitted and received by the sensor unit; and a signal deflection apparatus arranged in the area of the sensor unit with a reflector surface deflecting the signal emitted by the sensor unit in a direction deviating from the propagation direction of the signal, in particular at an essentially right angle to the propagation direction of the signal, in the direction of the object.

Another embodiment may have a vehicle with an inventive distance measurement system.

According to another embodiment, a measurement unit for a distance measurement system for non-contact determination of a distance to an object may have: a sensor unit configured to emit a signal and to receive a signal reflected by the object; and a signal deflection apparatus arranged in the area of the sensor unit with a reflector surface deflecting the signal emitted by the sensor unit in a direction deviating from the propagation direction of the signal, in particular at an essentially right angle to the propagation direction of the signal, in a direction of the object.

Another embodiment may have a vehicle with a measurement unit for a distance measurement system for non-contact determination of a distance to an object including a sensor unit configured to emit a signal and to receive a signal reflected by the object; and a signal deflection apparatus arranged in the area of the sensor unit with a reflector surface deflecting the signal emitted by the sensor unit in a direction deviating from the propagation direction of the signal, in particular at an essentially right angle to the propagation direction of the signal, in a direction of the object; or a vehicle with a measurement unit for non-contact determination of a distance to an object including a sensor unit configured to emit a signal and to receive a signal reflected by the object; an evaluation unit determining a distance between the measurement unit and the object from the signals emitted and received by the sensor unit; and a signal deflection apparatus arranged in the area of the sensor unit with a reflector surface deflecting the signal emitted by the sensor unit in a direction deviating from the propagation direction of the signal, in particular at an essentially right angle to the propagation direction of the signal, in the direction of the object, wherein the vehicle is a mobile construction or work machine.

Embodiments of the present invention provide a distance measurement system for a vehicle, wherein the distance measurement system comprises a measurement unit for non-contact determination of a distance to an object, and the measurement unit comprises:

- a sensor unit configured to emit a signal and to receive a signal reflected by the object;
- an evaluation unit determining a distance between the measurement unit and the object from the signals emitted and received by the sensor unit; and
- a signal deflection apparatus arranged in the area of the sensor unit with a reflector surface deflecting the signal emitted by the sensor unit in a direction deviating from the propagation direction of the signal, in particular at an essentially right angle to the propagation direction of the signal, in the direction of the object.

The signal emitted by the sensor unit is reflected by the object (obstacle) when impinging on the same. Here, it is advantageous to deflect the signal emitted by the sensor unit in its propagation direction, in particular when a distance to an object above the distance measurement system is to be determined. For this, the sensor unit itself does not have to be oriented toward the top (in the direction of the object or obstacle to be detected) but in horizontal direction, i.e. the sensor unit is oriented such that the signals are emitted in horizontal direction by the sensor unit. Thereby, for example, (rain) water can run off and does not remain on the sensor unit. Hence, even in rainy weather, functionality and availability of the sensor unit are not limited.

An evaluation unit consisting of a computing unit, for example a microcontroller system, calculates a distance value from the signals emitted and received by the sensor unit and the result is advantageously output and passed on to a control, for example a vehicle or machine control, for example per field bus message (CAN, LIN or the same). Based on the measured distance value, the control can then react accordingly, for example stop, decelerate, etc., movements of the vehicle or the machine. If the distance measurement system is used, for example, in an elevating work platform or a fire engine turntable ladder, the control can be a safety-oriented control.

Advantageously, the signal deflection apparatus is arranged directly in front of the sensor unit or at a (defined) distance to the same in measurement direction, i.e. in transmitting and receiving direction. In distance measurement, the distance to the reflector surface deflecting the signal emitted by the sensor unit in the direction of the object or obstacle has to be included in the calculation. However, this is known when designing the distance measurement system and can be stored (for example saved) as a constant in the evaluation means or the sensor unit. In the context of the present invention, propagation direction of the signals emitted and received by the sensor unit means the measurement direction, or in other words the respective directional vector of the emitted or received signal. The signal deflection apparatus deflects the emitted signal in the direction of the object such that the directional vector of the signal impinging on the object is essentially perpendicular to the directional vector of the signal emitted by the sensor unit. Here, the sensor unit transmits and receives the signal in opposite directions.

According to embodiments, the reflector surface deflects the signal reflected by the object in a direction deviating from the propagation direction of the reflected signal, in particular at an essentially right angle to the propagation direction of the reflected signal, in the direction of the sensor unit. The signal deflection apparatus deflects the signal reflected by the object in the direction of the sensor unit such that the directional vector of the signal reflected by the object is essentially perpendicular to the directional vector of the signal received by the sensor unit.

According to embodiments, the distance measurement system includes a measurement module on or in which the measurement unit is arranged. Advantageously, the measurement module is configured in a longitudinal manner, for example as measurement beam which can have a round, square, rectangular or similar cross-section. Here, the measurement unit can be arranged on the measurement module, for example screwed, adhered or stuck thereon or the same. However, an integrated variation is also possible, i.e. the measurement unit or parts thereof, for example the evaluation unit and/or the sensor unit are incorporated or integrated in the measurement module.

According to embodiments, the signal deflection apparatus is mounted on the measurement unit or on the measurement module in a releasable manner, in particular releasable without any tools. The signal deflection apparatus can, for example, be clicked (click connection), clamped, stuck or mounted by means of Velcro connection or the same on/to the measurement unit or the measurement module. This is particularly advantageous when the signal deflection apparatus is defect as the same can then be exchanged easily and possibly without any tools. However, it is also possible that the signal deflection apparatus is screwed onto the measurement unit or the measurement module.

According to embodiments, the signal deflection apparatus includes a holder and a reflector unit that are connected to each other in a releasable manner, in particular releasable without any tools. The holder can also be mounted on the measurement unit or on the measurement module in a releasable manner, however, a fixed mounting on the measurement module or a holder mechanism preformed at the housing of the measurement module is possible, i.e. a holder mechanism integrated in the housing of the measurement module. The reflector unit including the reflector surface is also arranged on the holder in a releasable manner. The reflector unit can, for example, be clicked (click connection), clamped, stuck or mounted by means of a Velcro connection or the same. If the reflector unit is, for example, defect, the same can advantageously be released from the holder and exchanged easily.

According to embodiments, the reflector unit is arranged on the holder in a slidable manner, in particular slidable to the side. Thereby, the measurements direction of the distance measurement can be changed easily or the measurement direction of the measurement module or the measurement unit can be changed and thereby be adapted to the conditions of the vehicle or the machine. If, for example, a measurement module having two measurement units is to be used on the vehicle or the machine for two different measurement directions, for example, in the first measurement unit, the reflector unit can be slid directly in front of the sensor unit, such that the signal emitted by the sensor unit of the first measurement unit is deflected in the direction of the object or the obstacle, whereas in the second measurement unit the reflector unit is slid towards the side, such that the signal emitted by the sensor unit of the second measurement unit is not deflected (and accordingly has a different measurement direction).

According to embodiments, the holder comprises a lock for locking the reflector unit and/or the reflector unit 52 comprises a lock for locking the same. Thereby, automatic release of the reflector unit during operation of the vehicle or the machine is advantageously prevented. Advantageously, the lock can be operated easily and quickly with the touch of a finger, such that the reflector unit can be released from the holder and exchanged easily. Here, the lock can be arranged on the holder and/or on the reflector unit.

According to embodiments, the signal deflection apparatus comprises at least one opening or at least one gap between the holder and the reflector unit. Thereby, advantageously, for example no (rain) water remains in the signal deflection apparatus, in particular when the measurement unit or the distance measurement system is oriented such that an object (obstacle) above the distance measurement system is to be detected. For this, the sensor unit is oriented in horizontal direction, i.e. the sensor unit is oriented such that the signals are emitted and received in horizontal direction by the sensor unit, whereas the reflector unit of the signal deflection apparatus can act like a funnel, such that without at least one opening or without at least one gap, (rain) water can remain therein and would affect functionality and availability of the sensor unit.

According to embodiments, the sensor unit comprises a sensor head configured to emit the signal and to receive the signal reflected by the object. For this, a sensor head is possible, which can both emit as well as receive (with time offset) signals, or a sensor head having a separate transceiver, wherein no switching between transmitting and receiving is needed.

According to embodiments, the signals emitted and received by the sensor unit are ultrasound signals, microwave signals or optical signals. Radar signals or the same are possible as microwave signals, for example, light (for example infrared light) or laser or the same can be used as optical signals. The reflector surface of the signal deflection apparatus is configured in an opal, glossy, mirrored or similar manner according to the used measurement technology (signals).

According to embodiments, the measurement module includes several measurement units that can be electrically connected to one another by means of a cable connection. Here, the measurement units can be arranged in or on the measurement module, for example screwed, adhered, stuck to/on the same or also completely or partly integrated in the same, i.e. measurement units or parts thereof, such as evaluation units and/or sensor units are incorporated or integrated in the measurement module. Evaluation units, each consisting, for example, of a computing unit, such as a microcontroller system, calculate distance values from the signals emitted and received by the sensor units, and the result is output or passed on to a control, for example a vehicle or machine control, via a cable connection, for example per field bus message (CAN, LIN or the same). Here, the measurement units can perform a respective distance measurement either simultaneously or offset in time, i.e. one after the other or in temporal sequence or in a priority-based manner. Due to the fact that the measurement units are electrically connected to one another and can hence exchange data via field bus messages, it is possible that both simultaneous as well as time-offset or priority-based (i.e. for example depending on the number or arrangement of the measurement units) measurement or measurements of distances is/are performed.

According to embodiments, the measurement units of a measurement module have a common evaluation unit. If, for example two or three measurement units are arranged in or on a measurement module, it is possible that the sensor units are electrically connected to a common evaluation unit. Thereby, the measurement module as a whole becomes more cost-effective since electronic components can be saved. However, it is also possible that more than two or three measurement units are electrically connected to a common evaluation unit. It is advantageous and cost-effective when all measurement units arranged in or on a measurement module are electrically connected to the same evaluation unit of a measurement module.

According to embodiments, the measurement units are arranged on or in a measurement module such that the same determine distances to the same object or distances to different objects. The measurement units can be arranged in the same detection direction in or on a measurement module, such that distances either to the same object (obstacle) or distances to different objects (different obstacles) are determined. On the other hand, the measurement units do not necessarily have to be arranged in the same detection direction in or on a measurement module, but can have different detection directions and can hence determine distances to different objects (different obstacles).

According to embodiments, the distance measurement system includes several measurement modules that can be connected to one another by means of an electric cable connection or a wireless connection. Measurement modules can be arranged by means of an electric cable connection or a wireless connection in a cascaded manner in a distance measurement system, i.e. the same can be connected in series or can be connected to one another such that the distance measurement system consists of two or several measurement modules. The measurement modules or the measurement units or the evaluation units arranged in the measurement units can communicate to one another and can output distance values or pass them on to a control, for example to a vehicle or a machine control, for example by means of a field bus system (CAN, LIN or the same). For this, advantageously, the field bus system of the distance measurement system is electrically connected to the field bus system of the machine or the vehicle. This cascading is advantageous since the distance measurement system can be designed or configured with a very flexible structure or design. The same can be individually adapted to different vehicles or machines, i.e. such that, for example, the number of measurement modules or the length of the cable connections between the individual measurement modules can be configured freely and very flexibly.

If a wireless connection of the measurement modules is used, a measurement module includes at least one accumulator to ensure the current supply of the individual measurement units. Here, the individual measurement modules in a distance measurement system communicate by means of radio signals, for example WLAN, Bluetooth or the like. A wireless connection of the measurement module is advantageous with regard to an attachment to a vehicle or a machine, since an even more flexible adaptation to the conditions of the vehicle or the machine is possible, for example because no cable routing is needed.

The measurement modules can perform a respective distance measurement either simultaneously or offset in time, i.e. one after the other or in temporal sequence or in a priority-based manner. Due to the fact that the measurement modules are electrically connected to one another (either wired or wireless) and can hence exchange data among each other, it is possible that both simultaneous as well as time-offset or priority-based (i.e. for example depending on the number or arrangement of the measurement modules) measurement or measurements of distances is/are performed.

A further embodiment relates to a vehicle having a distance measurement system as outlined above. According to embodiments, the vehicle is a mobile construction or work machine. This can, for example, be construction vehicles, construction machines (excavators, cranes, . . . ), road construction machines (finisher, feeder, presser (roller), . . . ) or other mobile vehicles or machines. In this context, vehicles used at airports are also possible (for example mobile stairways pulled up to a parking airplane, etc.). The inventive distance measurement system can be used in all vehicles and machines approximating an obstacle or object during operation where it is important to prevent collision, or where a distance to an obstacle or object is to be measured, detected or determined.

According to embodiments, the vehicle is an elevating work platform or a fire engine turntable ladder with a work cage movably arranged on the vehicle, wherein at least one distance measurement system is arranged on the work cage. The elevating work platform is, for example, a work platform having a telescopic crane mechanism or a so-called scissor stage. Fire engine turntable ladders frequently comprise a work cage moved together with the extendable ladder. Here, the distance measurement system is located at any position on the work cage and measures distances to one or several objects or obstacles.

According to embodiments, the work cage arranged movably on the vehicle comprises a floor and railings, and at least one distance measurement system is arranged on the floor and/or the railings or integrated in the floor and/or in the railings. If the at least one distance measurement system is mounted on the floor and/or the railings or the rails, this mounting can be releasable, in particular releasable without any tools, for example by means of a Velcro connection, a clamping connection, a plug apparatus, an adhesive apparatus or the same. Alternatively, the distance measurement system can, for example, be screwed, riveted or mounted in any other way on the floor and/or on the railings or the rails. Arranging the at least one distance measurement system or parts of the at least one distance measurement system in the floor and/or in the railings or the rails is possible. The individual parts of the railings or the rails of the work cage can be considered as measurement module in which the measurement units or at least parts thereof are incorporated or integrated such that further mechanisms in the form of separate measurement modules can advantageously be omitted.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
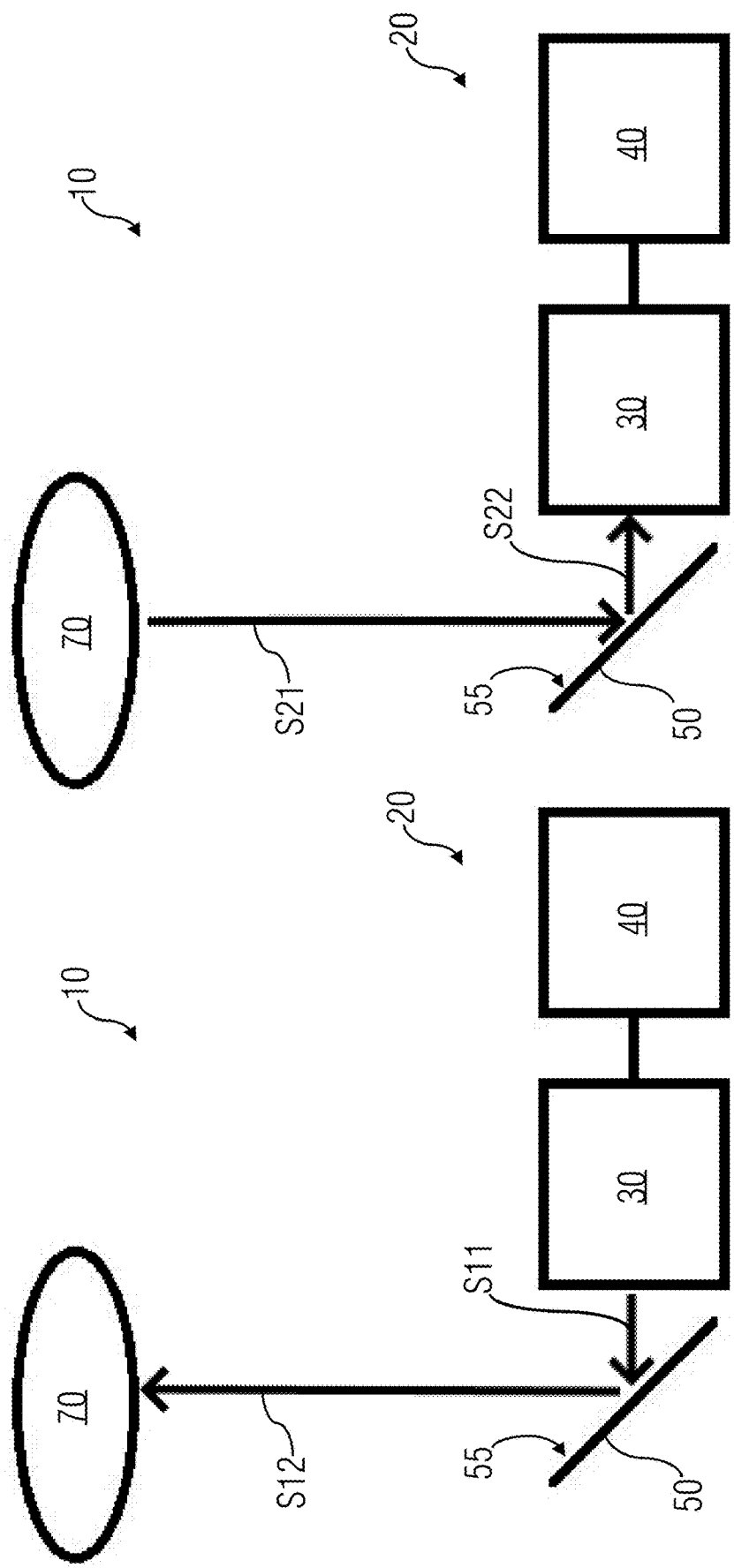
FIG. 1a,b is a schematic illustration of the functional principle of the distance measurement system.

Before embodiments of the present invention will be discussed in more detail below based on the figures, it should be noted that equal elements are provided with the same reference numbers, such that the description of the same is inter-applicable or inter-exchangeable. In distance measurements, the distance to the reflector surface 55 that deflects the signal S11 emitted by the sensor unit 30 in the direction of the object 70 or the obstacle 70 has to be incorporated in the calculation. Since this distance value should be known when designing the distance measurement system 10, the value can, for example, be stored (for example saved) as a constant in the evaluation means 40 or the sensor unit 30.

FIGS. 1a and 1b show a distance measurement system 10, each in a schematic illustration, to explain the basic mode of operation of the distance measurement. The distance measurement system 10 comprises a measurement unit 20 for non-contact determination of a distance to an object 70 (an obstacle, such as a wall, a roof, a roof overhang or the same), wherein the measurement unit 20 essentially comprises a sensor unit 30, an evaluation unit 40 and a signal deflection apparatus 50. The sensor unit 30 is configured to emit a signal S11, S12 and to receive a signal S21, S22 reflected by the object 70. The evaluation unit 40 determines a distance between the measurement unit 20 and the object 70 from the signals S11, S12 emitted by the sensor unit 30 and the signals S21, S22 received by the same, for example based on the signal runtime, i.e. based on the time difference between the emitted signals S11, S12 and the received signals S21, S22. The signal deflection apparatus 50 arranged in the area of the sensor unit 30 comprises a reflector surface 55 that is at an angle of approximately 45° to the sensor unit 30, such that the signal S11 emitted by the sensor unit 30, when impinging on the reflector surface 55, is deflected in a direction deviating from the propagation direction of the signal S11, in particular at an essentially right angle to the propagation direction of the signal S11, in the direction of the object 70. Here, the angle of the reflector surface 55 to the sensor unit 30 can have a range of approximately 40° . . . 50° or a range of approximately 30° . . . 50°. When impinging on the object 70, the deflected signal S12 is reflected at the same, and when impinging on the reflected surface 55, the same is reflected in a direction deviating from the propagation direction of the reflected signal S21, in particular at an essentially right angle to the propagation direction of the reflected signal S21, in the direction of the sensor unit 30. Now, the signal S22 deflected by the deflector surface 55 impinges on the sensor unit 30 and is received there by a sensor head 31 (not illustrated). The sensor head 31 can be configured to emit the signal S11 and to receive the signal S22 reflected by the object 70 and deflected by the signal deflection apparatus 50. Here, both a sensor head that can both emit as well as receive (with time offset) signals or a sensor head having a separate transceiver is possible, wherein no switching between transmitting and receiving is needed. For example, an ultrasound sensor head can be used, where the ultrasound waves propagate in a "lobe-shape", as illustrated schematically in FIG. 5. This "lobe-shaped" propagation is of less significance in signal propagation on the short path (distance) from the sensor unit 30 or the sensor head 31 to the reflector surface 55, as the ultrasound lobe could not propagate in its cross-section on the short path (distance) such that this has a negative influence on a measurement, i.e. a distance measurement.

Figure 2:
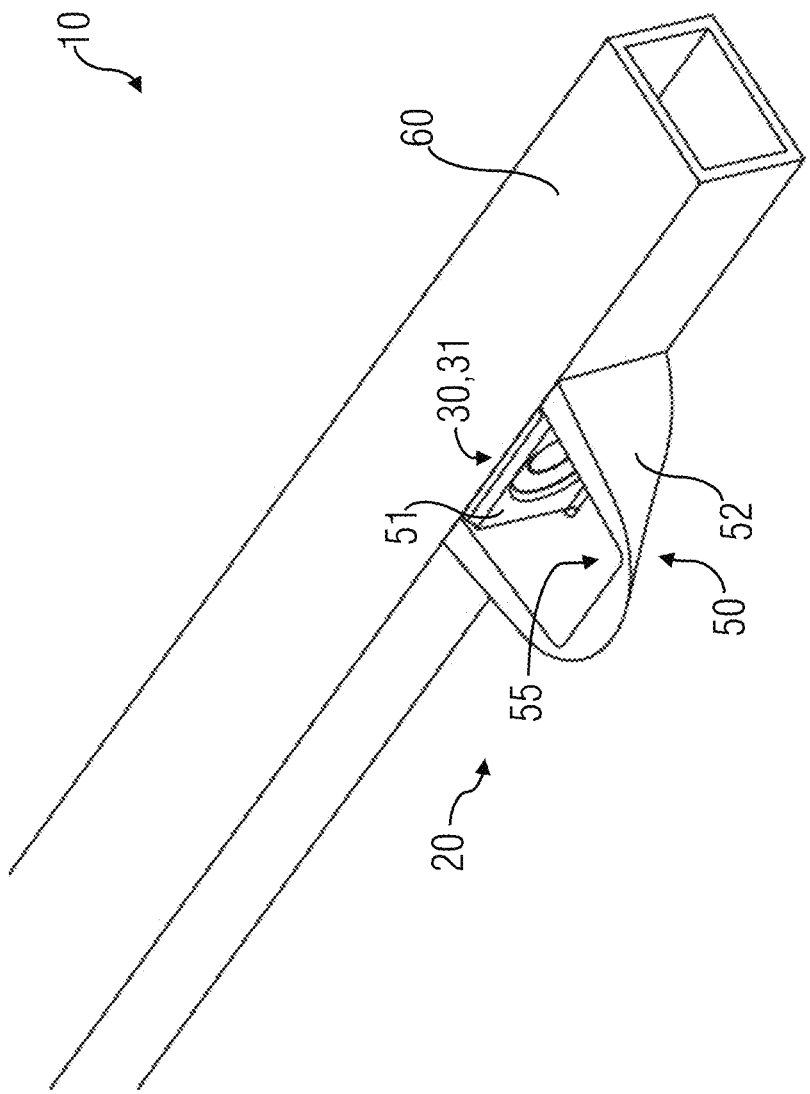
FIG. 2 is a schematic illustration (section) of a measurement module.

FIG. 2 shows a schematic illustration (section) of a measurement module 60 with a measurement unit 20 partly arranged therein. The measurement module 60 is configured in a longitudinal manner, for example as measurement beam and formed with a rectangular cross-section according to FIG. 2. The evaluation unit 40 and the sensor unit 30 (with the sensor head 31) are arranged in the measurement module 60, i.e. incorporated or integrated in the measurement module 60. The signal deflection apparatus 50 is arranged on the measurement module 60 in the area in front of the sensor unit 30. As illustrated in FIG. 2, the signal deflection apparatus 50 consists of a holder 51 and a reflector unit 52 which are connected to one another in a releasable manner, in particular releasable without any tools. Here, the holder 51 is mounted either in a fixed manner or also in a releasable manner on the housing of the measurement module 60. The reflector unit 52 including the reflector surface 55 is arranged on the holder 51 in a releasable manner, for example plugged onto the same.

Figure 3:
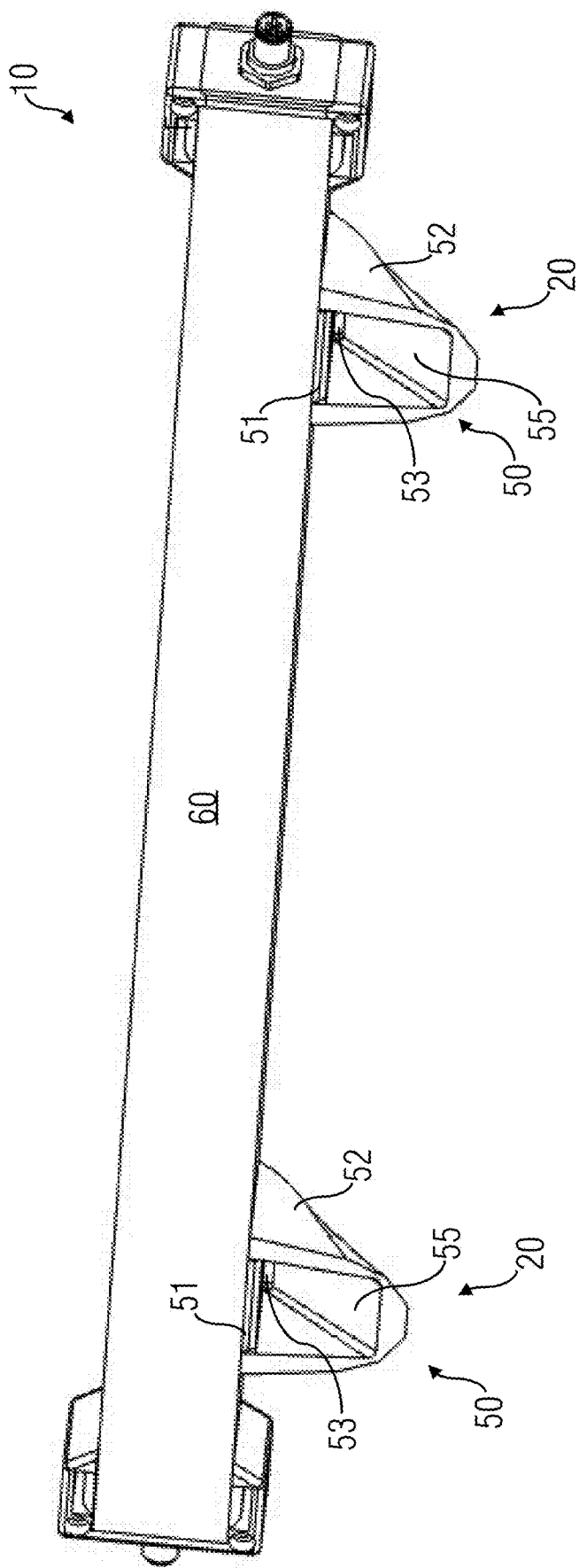
FIG. 3 is a schematic illustration of a measurement module.

FIG. 3 shows a schematic illustration of a measurement module 60 having two measurement units 20 partly arranged therein. Plug connectors are arranged on the lateral ends of the measurement module 60, in order to arrange further measurement modules 60 by means of an electric cable connection in a cascaded manner, i.e. to connect them in series (daisy chain) or to connect them to one another, such that a distance measurement system 10 of two or several measurement modules results. Similar to the description of FIG. 2, the measurement module 60 is configured in a longitudinal manner and formed with a rectangular cross-section. Here, it should be noted that the measurement module 60 can also have a round, square or similar cross-section. The measurement module 60 has, for example, a length of 60 cm, or a length in a range of approximately 40 cm . . . 100 cm or in a range of approximately 40 cm . . . greater than 100 cm. The evaluation unit 40 and the sensor unit 30 (not illustrated in FIG. 3) are arranged in the measurement module 60, i.e. incorporated or integrated in the measurement module 60. The signal deflection apparatus 50 consisting of a holder 51 and a reflector unit 52 connected to one another in a releasable manner, in particular releasable without any tools, is arranged on the measurement module 60. The signal deflection apparatus 50 comprises an opening 53 or a gap 53 between the holder 51 and the reflector unit 52, such that, for example no (rain) water remains in the signal deflection apparatus 50 when the measurement unit 20 or the distance measurement system 10 is oriented such that an object 70 above the distance measurement system 10 is to be detected.

Figure 5:
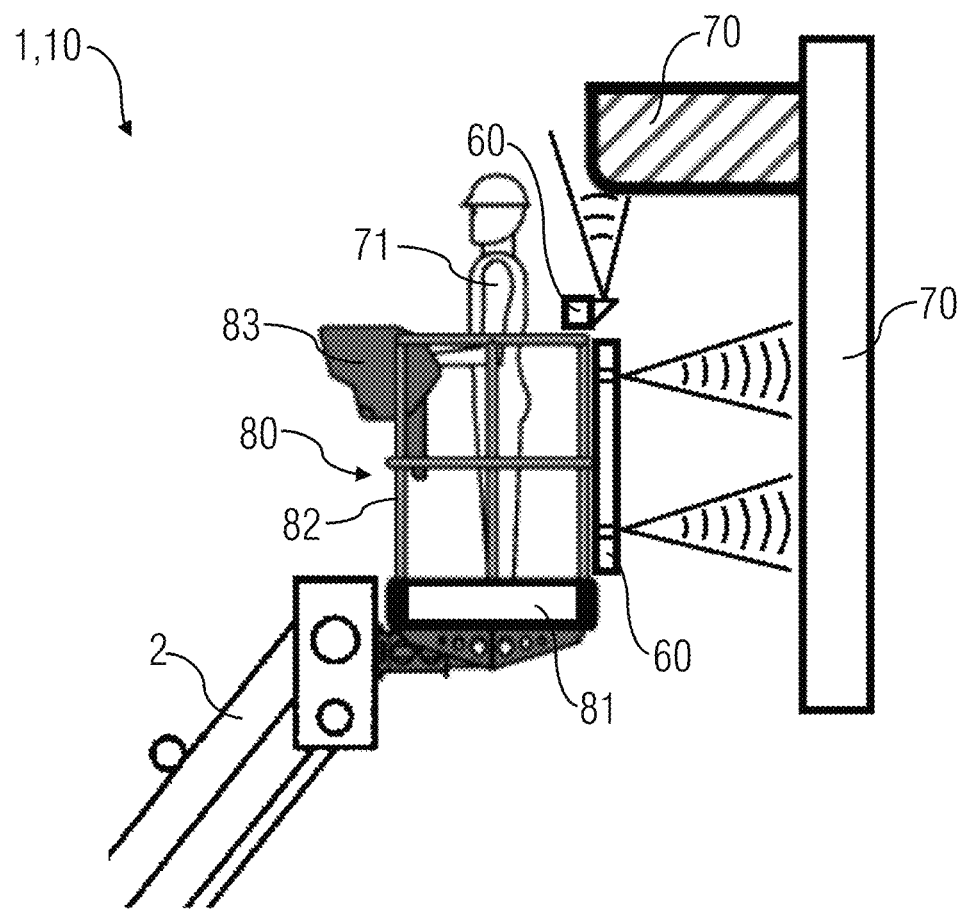
FIG. 5 is an elevating work platform with a distance measurement system.

If, for example, an ultrasound sensor head is used for distance measurement, the ultrasound waves normally propagate "in a lobe shape" as, for example, illustrated schematically in FIG. 5 and already briefly described above with respect to FIG. 1. The "lobe-shaped" propagation of the ultrasound waves has to be considered when arranging the measurement units 20 in or on a measurement module 60, since signal overlapping might occur (if, for example, the distance between two measurement units 20 is too low), i.e. that the emitted and/or reflected ultrasound lobes of two measurement units 20 can overlap.

Such overlapping of ultrasound lobes occurs (as shown in practical tests), for example starting from a measurement distance (between measurement unit 20 and object 70) of approximately 1.80 m, when two adjacent measurement units 20 are arranged at a distance of approximately 40 cm in or on a measurement module 60. On the other hand, the "lobe-shaped" propagation of ultrasound waves has the advantage that there is a large detection area of the distance measurement system 10, i.e. as many objects 70 or obstacles 70 as possible are detected by the distance measurement system 10.

Figure 4:
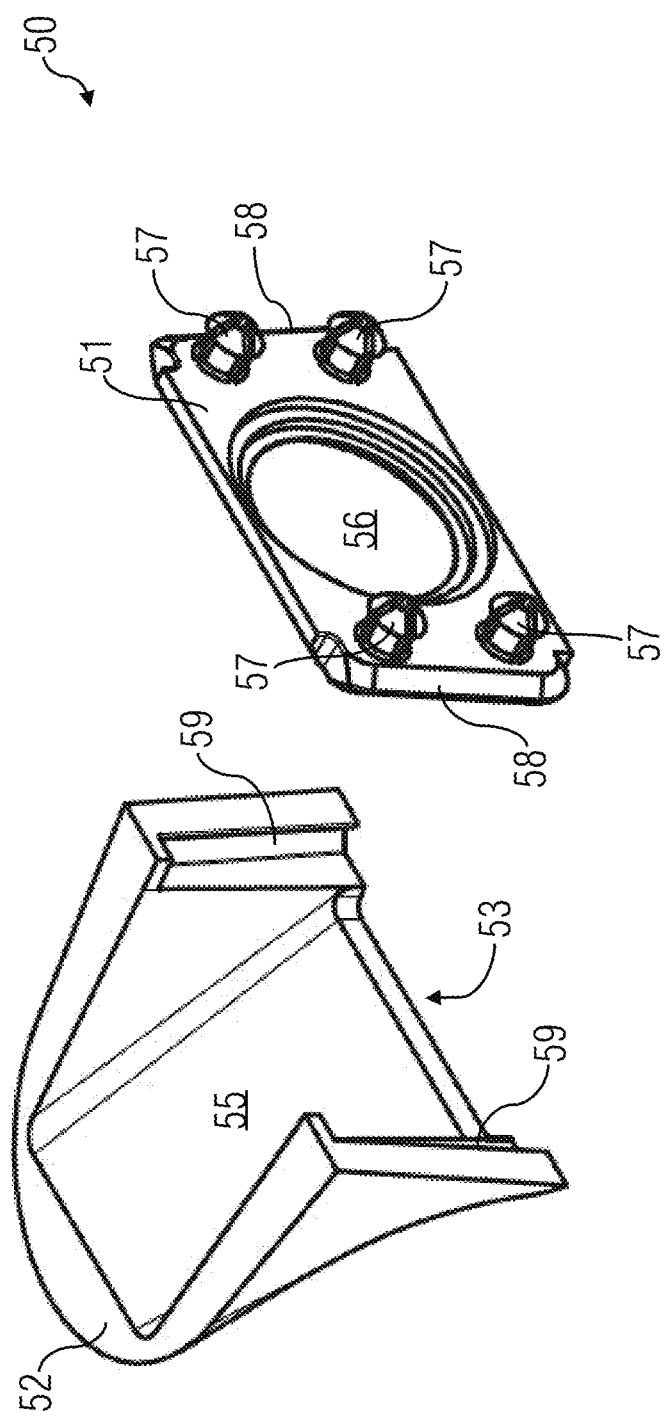
FIG. 4 is a schematic illustration of a reflector unit and a holder.

FIG. 4 shows a schematic illustration of a reflector unit 52 and an allocated holder 51. According to FIG. 4, the holder 51 is illustrated as releasable unit having a click mechanism 57 by means of which the holder 51 can be attached to the measurement module 60 in a releasable manner. The holder 51 has an opening 56 in the center, which is needed for the sensor unit 30 (not illustrated in FIG. 4). The sensor unit 30 emits the signal S11, S12 through the opening 56 and receives the signal S21, S22 reflected by the object 70. The reflector unit 52 includes the reflector surface 55 and can be arranged on the holder 51 in a releasable manner. For this, the reflector unit 52 comprises two lateral grooves 59 directed to the inside, whereby the reflector unit 52 can be plugged onto the lateral edges 58 of the holder 51. As already illustrated in FIG. 3, the signal deflection apparatus 50 comprises an opening 53 or a gap 53 when the holder 51 and the reflector unit 52 are connected to one another.

FIG. 5 shows an elevating work platform 1 with a crane mechanism 2 movably arranged on the elevating work platform 1 and a work cage 80, wherein the work cage 80 can be moved by means of the crane mechanism 2. The work cage 80 comprises a floor 81 and railings 82 as well as a control panel 83 by means of which a person 71 in the work cage can move the work cage. Further, a distance measurement system 10 consisting of two measurement modules 60 is arranged on the work cage 80 of the elevating work platform 1, more exactly on the railings 82. The distance measurement system 10 or the two measurement modules 60 detect or measure distances to two objects 70 as illustrated in FIG. 1, to a wall 70 and to a roof overhang 70. The distance measurement system 10 or the measurement modules 60 mounted to the railings 82 or to the rails 82 according to FIG. 5 can be mounted in a releasable manner, in particular releasable without any tools, for example by means of a Velcro connection, a clamping connection, a plug apparatus, an adhesive apparatus or the same. Alternatively, the distance measurement system 10 or the measurement module 60 can also be screwed, pivoted or mounted otherwise on the railings 82 or the rails 82. Arranging the distance measurement system 10 or parts of the distance measurement system 10 on or in the floor 81 and/or in the railings 82 or the rails 82 is also possible.

It would also be possible that further measurement modules 60, which extend the distance measurement system 10, are arranged on the elevating work platform 1 according to FIG. 5, since all measurement modules 60 arranged on the elevating work platform 1 can be connected to one another by means of an electric cable connection or a wireless connection. This means further measurement modules 60 can be arranged on the work cage 80, for example in or on the floor 81, in or on the rails 82, but also in or on the crane mechanism 2 or other movable machine parts. A "virtual space" results by a respective arrangement of one or several measurement modules 60 or one or several distance measurement systems 10 on the vehicle or on the machine, which means that, for example, all or at least most areas around the work cage 80 of an elevating platform 1 are detected by the measurement modules 60 or distance measurement systems 10 (if several separate systems 10 are arranged on the vehicle or on the machine). This is advantageous since, for example, a work cage 80 of an elevating work platform 1 can move in all possible directions, wherein obstacles 70 cannot be seen or detected by the person standing on the work cage 80. The measurement module 60 can be arranged freely in their orientation on the machine 1, i.e. perpendicularly or horizontally as well as in all directions. There are no limitations. All measurement modules 60 can be electrically connected to one another and can hence form an entire distance measurement system 10. Due to the fact that the measurement modules 60 can be arranged in a cascaded manner, i.e. connected in series (daisy chain) or connected to one another by means of an electric cable connection or a wireless connection, it is possible that the measurement modules 60 or the measurement units 20 or the evaluation means 40 arranged in the measurement unit, communicate with one another by means of a field bus system (CAN, LIN or the same), and/or output or pass on distance values to a control, for example to a vehicle or machine control. For this, advantageously, the field bus system of the distance measurement system 20 is electrically connected to the field bus system of the machine or the vehicle. Cascading measurement modules 60 as described above is advantageous since the distance measurement system can be designed or configured with a very flexible structure. The same can be individually adapted to different vehicles or machines, i.e. the number of measurement modules 60 or the length of the cable connections between the individual measurement modules can be designed freely and very flexibly. If a wireless connection of the measurement module 60 is used, the individual measurement modules 60 in a distance measurement system 10 communicate with one another via radio signals, for example WLAN, Bluetooth or the like. A wireless connection of the measurement modules 60 is advantageous with regard to an attachment to a vehicle or a machine, since here, for example, a more flexible adaptation to the circumstances of the vehicle or the machine is possible because no cable routing is needed.

The above-described embodiments are merely illustrative for the principles of the present invention. It is understood that modifications and variations of the arrangements and the details described herein will be apparent to others skilled in the art. It is the intent, therefore, that the invention is limited only by the scope of the appended patent claims and not by the specific details presented by way of description and explanation of the embodiments herein.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Distance measurement system for a vehicle, wherein the distance measurement system comprises a measurement unit for non-contact determination of a distance to an object, and the measurement unit comprises:
   a sensor unit configured to emit a signal along a propagation direction and to receive a signal reflected by the object;
   an evaluation unit comprising of a microcontroller for determining a distance between the measurement unit and the object from the signals emitted and received by the sensor unit; and
   a signal deflection apparatus having a funnel-shape and arranged in the area of the sensor unit with a reflector surface deflecting the signal emitted by the sensor unit in a direction deviating from the propagation direction of the signal or at an essentially right angle to the propagation direction of the signal, in a direction away from ground and in the direction of the object;
   wherein the funnel-shape signal deflection apparatus comprises an opening or hole or slit or gap looking and being open to the ground.

2. Distance measurement system according to claim 1, wherein the reflector surface is arranged at a fixed angle with respect to the propagation direction of the signal and/or the sensor unit.

3. Distance measurement system according to claim 1, wherein the reflector surface is arranged at an angle of 45° or at an angle in the range of 40 to 50° or in a range of 30 to 50° to said propagation direction.

4. Distance measurement system according to claim 1, wherein the signal deflected by the reflector surface is emitted in a deviating direction, which is perpendicular with respect to the ground and/or in an angle in the range of 70 to 110° or 50 to 140° with respect to the ground.

5. Distance measurement system according to claim 1, wherein the reflector surface deflects the signal reflected by the object in a direction deviating from the propagation direction of the reflected signal or at an essentially right angle to the propagation direction of the reflected signal, in the direction of the sensor unit.

6. Distance measurement system according to claim 1, wherein the distance measurement system comprises a measurement module, configured in a longitudinal manner, on or in which the measurement unit is arranged.

7. Distance measurement system according to claim 6, wherein the measurement module comprises several measurement units that can be electrically connected to one another by means of a cable connection.

8. Distance measurement system according to claim 7, wherein the measurement units of a measurement module share the evaluation unit consisting of the microcontroller.

9. Distance measurement system according to claim 7, wherein the measurement units are arranged on or in the measurement module such that the measurement modules determine distances to the same object or distances to different objects.

10. Distance measurement system according to claim 6, wherein the distance measurement system comprises several measurement modules that can be connected to one another by means of an electric cable connection or a wireless connection.

11. Distance measurement system according to claim 1, wherein the signal deflection apparatus is mounted on the measurement unit or on the measurement module in a releasable manner or releasable without any tools.

12. Distance measurement system according to claim 1, wherein the signal deflection apparatus comprises a holder and wherein the holder and the reflector unit are connected to one another releasable without any tools.

13. Distance measurement system according to claim 12, wherein the holder comprises a lock for locking the reflector unit and/or that the reflector unit comprises a lock for locking the same.

14. Distance measurement system according to claim 12, wherein the signal deflection apparatus comprises at least one opening or at least one gap between the holder and the reflector unit.

15. Distance measurement system according to claim 1, wherein the sensor unit comprises a sensor head configured to emit the signal and to receive the signal reflected by the object.

16. Distance measurement system according to claim 1, wherein the signals emitted and received by the sensor unit are ultrasound signals, microwave signals or optical signals.

17. Vehicle with a distance measurement system according to claim 1.

18. Vehicle with a distance measurement system according to claim 1, wherein the vehicle is a mobile construction or work machine.

19. Vehicle with a distance measurement system according to claim 1, wherein the vehicle is an elevating work platform or fire engine turntable ladder with a work cage movably arranged on the vehicle, wherein at least one distance measurement system is arranged on the work cage.

20. Vehicle according to claim 19, wherein the work cage arranged movably on the vehicle comprises a floor and railings, and at least one distance measurement system is arranged on the floor and/or on the railings or integrated in the floor and/or in the railings.

21. Distance measurement system according to claim 1, wherein the signal deflection apparatus comprises a holder and a reflector unit that are connected to one another in a releasable manner, wherein the reflector unit comprising the reflector surface is arranged on the holder in a slidable manner or slidable to the side.

22. Measurement unit for a distance measurement system for non-contact determination of a distance to an object, the measurement unit comprising:
   a sensor unit configured to emit a signal along a propagation direction and to receive a signal reflected by the object; and
   a signal deflection apparatus having a funnel-shape and arranged in the area of the sensor unit with a reflector surface deflecting the signal emitted by the sensor unit in a direction deviating from the propagation direction of the signal or at an essentially right angle to the propagation direction of the signal, in a direction away from ground and in the direction of the object;
   wherein the funnel-shape signal deflection apparatus comprises an opening or hole or slit or gap looking and being open to the ground.

23. Vehicle with a measurement unit for a distance measurement system for non-contact determination of a distance to an object, the measurement unit comprising:

a sensor unit configured to emit a signal along a propagation direction and to receive a signal reflected by the object; and a signal deflection apparatus having a funnel-shape and arranged in the area of the sensor unit with a reflector surface deflecting the signal emitted by the sensor unit in a direction deviating from the propagation direction of the signal or at an essentially right angle to the propagation direction of the signal, in a direction away from ground and in the direction of the object, wherein the funnel-shape signal deflection apparatus comprises an opening or hole or slit or gap looking and being open to the ground;

wherein the vehicle is a mobile construction or work machine.

24. Vehicle with a measurement unit for non-contact determination of a distance to an object, the measurement unit comprising:

a sensor unit configured to emit a signal along a propagation direction and to receive a signal reflected by the object;

an evaluation unit consisting of a microcontroller for determining a distance between the measurement unit and the object from the signals emitted and received by the sensor unit; and a signal deflection apparatus having a funnel-shape and arranged in the area of the sensor unit with a reflector surface deflecting the signal emitted by the sensor unit in a direction deviating from the propagation direction of the signal or at an essentially right angle to the propagation direction of the signal, in a direction away from ground and in the direction of the object, wherein the funnel-shape signal deflection apparatus comprises an opening or hole or slit or gap looking and being open to the ground, wherein the vehicle is a mobile construction or work machine.

* * * * *